United States Patent [19]  
Arima et al.

[11] 4,361,597  
[45] Nov. 30, 1982

[54] PROCESS FOR MAKING SENSOR FOR DETECTING FLUID FLOW VELOCITY OR FLOW AMOUNT

[75] Inventors: Hideo Arima, Yokohama; Mituko Ito, Yokosuka; Akira Ikegami, Yokohama; Sadayasu Ueno, Katsuta; Kanemasa Sato, Katsuta; Yutaka Nishimura, Katsuta, all of Japan

[73] Assignee: Hitachi, Ltd., Tokyo, Japan

[21] Appl. No.: 229,179

[22] Filed: Jan. 27, 1981

[30] Foreign Application Priority Data

Jan. 28, 1980 [JP] Japan ................................ 55-7832

[51] Int. Cl.$^3$ .................. H01C 7/04; B05D 3/06; B05D 5/12
[52] U.S. Cl. ............................ 427/53.1; 29/620; 338/25; 338/28; 338/308; 338/309; 427/102; 427/125; 427/401
[58] Field of Search .............. 427/53.1, 101, 102, 427/103, 125, 401; 204/195 G, 195 R; 338/25, 28, 307–309, 314; 29/620

[56] References Cited

U.S. PATENT DOCUMENTS

| 3,864,825 | 2/1975 | Holmes | 338/308 X |
| 4,146,957 | 4/1979 | Toenshoff | 338/28 X |
| 4,191,938 | 3/1980 | Gow et al. | 338/308 X |
| 4,222,025 | 9/1980 | Iles et al. | 338/25 |

OTHER PUBLICATIONS

*A Thick Film Platinum Resistance Thermometer*, Iles, G. S. et al., 1975.

Primary Examiner—Michael R. Lusignan  
Attorney, Agent, or Firm—Antonelli, Terry & Wands

[57] ABSTRACT

A sensor for detecting a fluid flow velocity or flow amount with high precision and high reliability is made by applying a conductor paste comprising platinum powder and an organic vehicle to the outer surface of a fine inorganic insulating tube, followed by drying and firing, thereby forming a platinum film, processing the platinum film into a spiral band form by laser application, inserting a lead wire into the insulating tube, applying a platinum conductor paste to between the spiral platinum band and the lead wire, followed by drying and baking, thereby connecting the spiral platinum band film to the lead wire.

15 Claims, 2 Drawing Figures

PROCESS FOR MAKING SENSOR FOR DETECTING FLUID FLOW VELOCITY OR FLOW AMOUNT

BACKGROUND OF THE INVENTION

1. Field of the Invention

This invention relates to a process for making a sensor for detecting a fluid flow velocity or flow amount by utilizing a dependency of resistance of a platinum resistor upon temperature.

2. Brief Description of the Prior Art

It is possible to detect a fluid flow velocity of flow amount by utilizing a dependency of resistance upon temperature, and this has been practically utilized as a hot wire sensor for detecting a fluid flow velocity or flow amount, where the sensor is heated up to 100°-200° C. by passing an electric current through the sensor, and when a fluid comes in contact with a sensor, the heat is carried away by the fluid from the sensor in such an amount as to correspond to the fluid flow velocity or flow amount, and consequently the resistance of sensor is changed. That is, a fluid flow velocity or flow amount can be detected from such a change in resistance of sensor. Generally, a platinum wire or tungsten wire is used as the resistor.

The conventional hot wire sensor for detecting a fluid flow velocity of flow amount can be classified into the following three major groups: (1) coil type, (2) fine wire type and (3) a thin film type. The coil type (1) is a platinum wire, etc. wound around a glass bar, etc., and has a high mechanical strength, but it is difficult to uniformly and densely wind the wire around the glass bar. Thus, the product yield is deteriorated and the production cost is high. Furthermore, the wire diameter is not always uniform, so that the precision of resistance is not so high. The fine wire type (2) is platinum wires or tungsten wires having a diameter as small as a few $\mu m$ connected to between lead wires, and has a low resistance to mechanical shock, and when fouled, it will have a much lower resistance to mechanical shock due to an increased weight on the sensor part. Furthermore, the wire diameter is not always uniform, and adjustment of wire length is difficult to effect due to their processability, so that the precision of resistance is low, and the production cost is high.

The thin film type (3) is a platinum film formed at the tip end of quartz bar by vapor deposition, etc. and it is difficult to obtain a film of uniform thickness, so that the precision of resistance is low. Furthermore, the vapor deposition and other relevant processing technique are not suitable for mass production. That is, the thin film type (3) is not suitable for the mass production, and also the production cost is high.

Recently, such a resistor for detecting temperature has been proposed, which is prepared by providing a platinum film spirally on the surface of an aluminum tube by coating, inserting an electrode into the tube, connecting the platinum film to the electrode through a conductor paste, and covering the platinum film with crystallizable glass. Application of such a resistor as a sensor for detecting a fluid flow velocity or flow amount has the following disadvantages (1)-(3).

(1) Since a conductor film is prepared by applying a uniform mixture of platinum powder and glass powder in an organic vehicle, followed by firing at less than 1,100° C., the growth of platinum particles is suppressed, and a platinum film with stable characteristics is hard to obtain. Furthermore, a change in characteristics with time is large.

(2) Crystallizable glass for covering the conductor film is less gas-tight than non-crystallizable glass, and the film must be made thicker, so that a response speed is lowered.

(3) Outer diameter is as large as 3 mm, and the shape is not suitable for detecting a fluid flow velocity or flow amount.

SUMMARY OF THE INVENTION

An object of the present invention is to provide a process for making a sensor for detecting a fluid flow velocity or flow amount with a high precision of resistance and a high mechanical strength at a low cost, which is free from the above-mentioned disadvantages of the prior art.

The object of the present invention is attained by utilizing a film coating technique and a laser processing technique, that is, by (1) applying a paste of metal powder such as platinum powder, etc. dispersed in an organic vehicle to the outer surface of an inorganic insulating tube of ceramics, alumina, quartz, titania, glass, etc., drying the paste and firing the paste at a high temperature, thereby forming a metal film such as a platinum film, etc., (2) providing a spiral groove on the metal film by laser processing so that, there may not be any platinum film remains in the groove, thereby obtaining a spiral resistor band having a predetermined resistance, and (3) providing an inorganic insulating coat of glass, etc. on the spiral resistor band, with further provision of terminals thereto.

It is necessary to use an insulating tube made of material having a thermal conductivity of less than 0.21 J/cm. S.K such as alumina, quartz, glass, zircon, forsterite, mullite, zirconia, titania, etc., because heat loss at the terminals can be prevented and consequently the sensitivity can be increased.

It is necessary that the length of tube is at least 4 times as large as the outer diameter of the tube, preferably 4-20 times as large, since the heat loss at the terminals can be prevented, and consequently the sensitivity can be increased.

It is necessary that the outer diameter of the tube is 0.6 mm or less, preferably 0.1-0.6 mm, and the thickness of the tube is 0.2 mm or less, preferably 0.03-0.2 mm, since the response time can be shortened.

It is necessary to use the paste containing 65-85% by weight of platinum powder uniformly dispersed and mixed in 35-15% by weight of an organic vehicle. If the paste contains more than 85% by weight of platinum powder, uneven dispersion prevails in the paste, and the resulting metal film will have an uneven distribution of electroconductivity. If the paste contains less than 65% by weight of platinum powder, the paste has too low a viscosity, and immersion and firing must be carried out repeatedly to obtain a desired film thickness.

It is necessary that the platinum film prepared from the paste is 4-25 $\mu m$ thick. If the thickness of platinum film is less than 4 $\mu m$, there may be unevenness in the coating, and parts with no platinum film may often occur, or there may be unevenness in film thickness, and disconnections may often occur when a spiral resistor band with a narrow width is prepared from the platinum film by laser application. If the thickness of platinum film is more than 25 $\mu m$, there may be some platinum film remains in the groove, or the groove itself is filled with cut-off pieces of platinum film and a short circuit may occur.

To obtain a platinum film with stable characteristics, it is necessary to conduct firing at 1,100°–1,400° C., which is higher than the conventional firing temperature for film, i.e. 1,000° C. or less, for at least 20 minutes. At a heat-treatment temperature less than 1,100° C., no substantial sintering of platinum particles occurs and the resulting characteristics become unstable. On the other hand, at a heat treatment temperature higher than 1,400° C., shrinkage due to sintering proceeds excessively, and the resulting film will not have a flat surface, but an irregularly uneven surface.

It is necessary that the groove prepared by laser processing is 7–100 μm wide, since the short circuit can be prevented, and a sensor with a high mechanical strength can be made. If the width of groove is less than 7 μm, there may often occur short circuits due to uneven cutting or cut-off pieces. If the width of groove is more than 100 μm, laser power must be considerable increased, and a damage of the insulating tube is increased thereby. The insulating tube will be more breakable.

It is necessary that the spiral groove has a pitch of 50–500 μm, since a sensor with a small detection error can be prepared. If the pitch is less than 50 μm, there may often occur disconnections in spiral resistor bands, and the product yield is deteriorated. On the other hand, if the pitch is more than 500 μm, the resistance per one turn of spiral resistor band and unit length of tube is so low that detection of fluid flow velocity or flow rate in a tiny space will be very difficult, and at the same time the detection error will be large.

It is necessary that the thickness of amorphous glass coat film to be laid on the platinum spiral band is 0.5–7 μm, since a sensor with high reliability and a short response time can be prepared. If the thickness of the glass coat film on the spiral resistor band is less than 0.5 μm, a change in resistance with time will be large, which seems to be due to a partly developed glass failure. If the thickness of the glass coat film is more than 7 μm, the response time will be long.

Gold and silver cannot be used as the metal powder, because they have a larger change in characteristics with time than platinum. Other noble metals than gold and silver are more expensive than platinum, and seem to have poorer characteristics than platinum.

Base metal powder cannot be used, since oxidation of a base metal film proceeds at the time of laser processing and glass coating and baking, and also at the time of actual use as a sensor, and the base metal film has a larger fluctuation in characteristics than the platinum film.

The glass coat material is amorphous glass, and includes, preferably, lead borosilicate glass, barium borosilicate glass, alkali silicate glass, etc. More specifically, they are lead borosilicate glass containing 10–90% by weight of PbO, 5–70% by weight of $SiO_2$, and 1–20% by weight of $B_2O_3$ as essential components, and optionally further containing $Al_2O_3$, $Na_2O$, $K_2O$, CaO, etc., barium borosilicate glass containing 5–70% by weight of $SiO_2$, 1–20% by weight of $B_2O_3$, and 5–40% by weight of BaO as essential components and optionally further containing PbO, $Na_2O$, $Al_2O_3$ $Bi_2O_3$, etc., and alkali silicate glass containing 5–90% by weight of $SiO_2$, 2–30% by weight of $K_2O$, and 1–20% by weight of $Na_2O$ as essential components and optionally further containing $Al_2O_3$, CaO, MgO, SrO, BaO, $Sb_2O_3$, etc.

It is necessary to use the amorphous glass, since (a) it is more gas-tight than crystallizable glass, and thus can keep a good gas tightness with a smaller thickness of coat film, (b) since the thickness of coat film is smaller, a response is better, and (c) an adhesion of the insulating tube to the spiral platinum resistor band is improved.

BRIEF DESCRIPTION OF THE DRAWINGS

In FIG. 2, numeral 6 is a lead wire.

DESCRIPTION OF THE PREFERRED EMBODIMENTS

The present invention will be described in detail below, referring to Examples.

EXAMPLE 1

Figure 1:
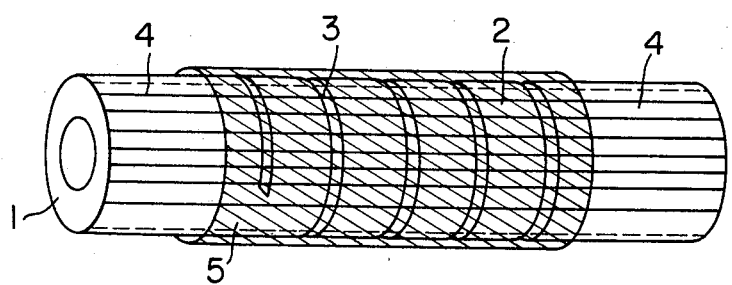
FIGS. 1 and 2 are schematic views showing a sensor for detecting a fluid flow velocity or flow amount made according to the present process, where numeral 1 is an insulating film, 2 a resistor film, 3 a groove prepared by laser processing, 4 electrode terminals and 5 a glass coat.

An electroconductive paste containing 70% by weight of platinum powder uniformly kneaded with 30% by weight of a tridecanol solution of ethylcellulose was applied to the outer surface of an alumina insulating tube 1 having an outer diameter of 0.6 mm, an inner diameter of 0.2 mm, and a length of 8 mm and baked at 900° C. for 10 minutes. The same paste was further applied thereto, dried at 100° C. for 2 hours, and heated at 1,100° C. for 2 hours to obtain a dense and stable platinum film having a thickness of 25 μm, as shown in FIG. 1. A spiral groove 5 with 12 turns was provided on the platinum film 2 at a pitch of 500 μm with a groove width of 100 μm by means of a laser trimmer at a frequency of 10 KHz and an output of 15 W to form a spiral platinum resistor band 2, whose both ends were made electrode terminals 4.

Amorphous glass of lead borosilicate system consisting of 55% by weight of PbO, 32% by weight of $SiO_2$, 1% by weight of $Al_2O_3$, and 12% by weight of $B_2O_3$ was applied to the spiral platinum resistor band 2 and the spiral groove 3, dried at 150° C. for 20 minutes, and baked at 800° C. for 10 minutes, whereby a glass coat film 5 having a thickness of 7 μm was obtained. Resistance of the resulting sensor was 5.0 Ω at room temperature, and had a temperature coefficient of 3,860 ppm/°K. and a response time of about 10 ms.

EXAMPLE 2

Figure 2:
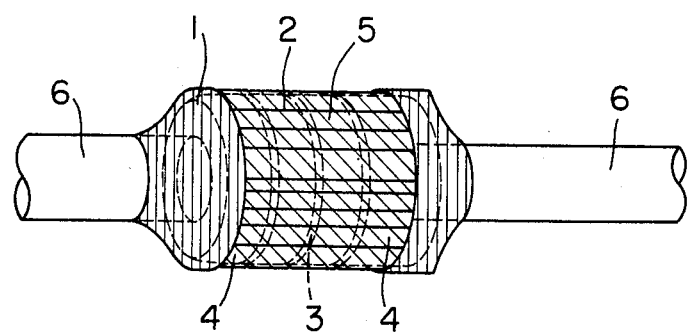

The same electroconductive paste as used in Example 1 was applied to the outer surface of a zirconia insulating tube 1 having an outer diameter of 0.4 mm, an inner diameter of 0.1 mm, and a length of 1.6 mm, dried and heated at 1,400° C. for 20 minutes, whereby a dense platinum film having a thickness of 4 μm was obtained, as shown in FIG. 2.

Then, a spiral groove 3 with 20 turns was provided on the platinum film at a pitch of 50 μm with a groove width of 7 μm by means of a laser trimmer under the same conditions as in Example 1 to form a spiral platinum resistor band 2, whose both ends were made electrode terminals 4. Lead wires 6 were inserted into the electrode terminals 4 and the same electroconductive paste as above was applied to over lead wires 6 and electrode terminals 4, dried at 150° C. for 20 minutes, and heated at 1,400° C. for 20 minutes, whereby lead wires 6 were connected to electrode terminals 4.

Amorphous glass of the same composition as used in Example 1 was applied to the spiral platinum resistor band 2 and the spiral groove, dried at 150° C. for 20 minutes, and baked at 800° C. for 10 minutes, whereby a glass coat film 5 having a thickness of 0.5 μm was obtained. Resistance of the resulting sensor was 30.0 Ω at room temperature, and had a temperature coefficient of 3,880 ppm/°K. and a response time of 2 ms.

EXAMPLE 3

The same electroconductive paste as used in Example 1 was applied to the outer surface of a forsterite insulating tube 1 having an outer diameter of 0.5 mm, an inner diameter of 0.3 mm, and a length of 3.0 mm, dried at 150° C. for 20 minutes, and heated at 1,200° C. for 2 hours to form a dense platinum film having a thickness of 15 μm, as shown in FIG. 2.

Then, a spiral groove 3 with 20 turns was provided on the platinum film at a pitch of 100 μm with a groove width of 20 μm by means of a laser trimmer under the same conditions as in Example 1 to form a spiral platinum resistor band 2, whose both ends as electrode terminals 4 were connected to lead wires 6 in the same manner as in Example 2.

Amorphous glass of lead borosilicate system consisting of 55% by weight of PbO, 32% by weight of $SiO_2$, 1% by weight of $Al_2O_3$ and 12% by weight of $B_2O_3$ was applied to the platinum resistor band and the spiral groove, dried at 150° C. for 20 minutes, and baked at 800° C. for 10 minutes to provide a glass coat film 5 having a thickness of 2 μm. Resistance of the resulting sensor was 20.0 Ω at room temperature, and had a temperature coefficient of 3,860 ppm/°K. and a response time of about 4 ms.

EXAMPLE 4

Amorphous glass of lead borosicate system consisting of 20% by weight of PbO, 55% by weight of $SiO_2$, 8% by weight of $Al_2O_3$, 8% by weight of CaO, 5% by weight of $B_2O_3$, and 4% by weight of $Na_2O$ was used under the same conditions as in Example 1, and the same results as in Example 1 was obtained.

The present process as described above can reduce a product cost, as compared with the conventional process, and can improve the precision of resistance to a range of ±0.5%, as compared with the conventional range of ± a few tens to ± a few %.

What is claimed is:

1. In a process for making a sensor for detecting a fluid flow velocity or flow amount, which comprises a step of applying an electroconductive paste containing platinum powder to the outer surface of an insulating tube, and firing the paste, thereby forming a platinum film on the outer surface of the insulating tube, a step of preparing a spiral groove on the platinum film by laser processing, thereby forming a platinum resistor band having a predetermined resistance while eliminating platinum remains from the groove, and a step of coating the platinum resistor band with amorphous glass, the improvement comprising said electroconductive paste containing platinum powder consisting of 65-85% by weight of platinum powder and 35-15% by weight of an organic vehicle, with said platinum powder uniformly dispersed in said organic vehicle, and the firing of the paste is carried out at a temperature of 1100° to 1400° C. for at least 20 minutes, whereby a sensor for detecting a fluid flow velocity or flow amount with a high precision of resistance and a high mechanical strength at low cost is formed.

2. A process according to claim 1, wherein the insulating tube is comprised of a material having a thermal conductivity of less than 0.21 J/cm. S.K selected from alumina, quartz, zircon, forsterite, mullite, zirconia and titania.

3. A process according to claim 1 or 2, wherein the insulating tube has an outer diameter of 0.6 mm or less, a thickness of 0.2 mm or less and a length at least 4 times as large as the outer diameter.

4. A process according to claim 1, wherein the platinum film formed on the outer surface of the insulating tube by firing has a thickness of 4-25 μm.

5. A process according to claim 1, wherein the spiral groove prepared by laser application has a groove width of 7-100 μm, and a pitch of 50-500 μm.

6. A process according to claim 1, wherein the amorphous glass coat film on the platinum resistor band has a thickness of 0.5-7 μm.

7. A process according to claim 3, wherein the insulating tube has a thickness of 0.03-0.2 mm.

8. A process according to claim 3, wherein the outer diameter of the tube is 0.1-0.6 mm.

9. A process according to claim 3, wherein said platinum film formed on the outer surface of the insulating tube by firing has a thickness of 4-25 μm.

10. A process according to claim 12, wherein the spiral groove prepared by laser application has a groove width of 7-100 μm, and a pitch of 50-500 μm.

11. A process according to claim 10, wherein the amorphous glass coat film on the platinum resistor band has a thickness of 0.5-7 μm.

12. A process according to claim 11, wherein the amorphous glass is a material selected from the group consisting of lead borosilicate glass, barium borosilicate glass and alkali silicate glass.

13. A process according to claim 1 or 6, wherein the amorphous glass is a material selected from the group consisting of lead borosilicate glass, barium borosilicate glass and alkali silicate glass.

14. A process according to claim 1, wherein, prior to coating the platinum resistor band with amorphous glass, lead wires are contacted to each end of said platinum resistor band, said electroconductive paste is applied over said lead wires and the ends of the platinum resistor band, and the paste is fired to connect the lead wires to the ends of the platinum resistor band.

15. A process according to claim 12, wherein, prior to coating the platinum resistor band with amorphous glass, lead wires are contacted to each end of said platinum resistor band, said electroconductive paste is applied over said lead wires and the ends of the platinum resistor band, and the paste is fired to connect the lead wires to the ends of the platinum resistor band.

* * * * *